United States Patent [19]
Powers et al.

[11] Patent Number: 5,319,537
[45] Date of Patent: Jun. 7, 1994

[54] RASER OUTPUT SCANNER COLOR PRINTER WITH IMPROVED START OF SCAN DETECTION AND PROCESS REGISTRATION

[75] Inventors: Edward A. Powers, Penfield; Kenneth R. Ossman, Macedon; Fred F. Hubble, III; James P. Martin, both of Rochester, all of N.Y.

[73] Assignee: Xerox Corporation, Stamford, Conn.

[21] Appl. No.: 988,587

[22] Filed: Dec. 10, 1992

[51] Int. Cl.$^5$ .......................... H04N 1/21; B41J 2/435
[52] U.S. Cl. ..................... 346/108; 346/160; 355/202
[58] Field of Search ............ 346/1.1, 107 R, 108, 346/76 L, 160; 358/296, 298, 300, 302, 481; 355/200, 202, 212

[56] References Cited

U.S. PATENT DOCUMENTS

| | | | |
|---|---|---|---|
| 4,386,272 | 5/1983 | Check, Jr. et al. | 250/236 |
| 4,611,901 | 9/1986 | Kohyama et al. | 355/4 |
| 4,791,452 | 12/1988 | Kasai et al. | 355/14 D |
| 4,833,503 | 5/1989 | Snelling | 355/259 |
| 5,208,796 | 5/1993 | Wong et al. | 369/97 |

Primary Examiner—Mark J. Reinhart

[57] ABSTRACT

A Raster Output Scanner (ROS) color printer is formed by providing several ROS imagers adjacent image exposure locations of a photoreceptor belt. Each ROS imager forms a separate color image in response to video input signals with each color image superimposed in registration over the previously formed images. Registration in the process direction is enabled by a quad cell photosensor whose output is continually compared to determine whether process registration deviations from a previously established position are necessary. Correction signals are generated in an iterative fashion until a preselected process registration position is reestablished. The quad cell detector is also used for a second function; to produce the start and end of scan signals which enable image registration in the cross-process direction.

5 Claims, 5 Drawing Sheets

RASER OUTPUT SCANNER COLOR PRINTER WITH IMPROVED START OF SCAN DETECTION AND PROCESS REGISTRATION

BACKGROUND OF THE INVENTION

The present invention relates to a color printer which uses a plurality of Raster Output Scanner (ROS) imagers to form sequential, registered color images on the surface of a photoreceptor belt moving through imaging stations associated with each imager. More particularly, the present invention is related to use of a quadrant photodetector cell which provides the dual functions of locating the start and end of each ROS scan line, as well as detecting and correcting for registration errors in the process direction.

In recent years, digital color printers have been increasingly utilized to produce output copies from input video data representing original image information. The printer may use a plurality of imagers, either ROS or LED print bars, to expose the charged portions of a photoconductive member to record an electrostatic latent image thereon. Generally, a ROS incorporates a laser for generating a collimated beam of monochromatic radiation. The laser beam is modulated in conformance with the image information. The modulated beam is incident on a scanning element, typically a rotating polygon having mirrored facets. The light beam is reflected from each facet and thereafter focused to a spot on the photosensitive member. The rotation of the polygon causes the spot to scan linearly across the photoconductive member in a fast scan (i.e., line scan) direction. Each scan line crosses a start of scan (SOS) sensor and an end of scan (EOS) sensor, which regulates the image forming areas of the exposed image. Meanwhile, the photoconductive member is advanced relatively more slowly in a slow scan direction which is orthogonal to the fast scan direction. In this way, the beam scans the recording medium with a plurality of scan lines in a raster scanning pattern. The time between the formation of each scan line is constant due to the uniformly rotating nature of the polygon. Thus, such operation is characterized as synchronous. The light beam is intensity-modulated in accordance with an input image serial data stream, at a rate such that individual picture elements ("pixels") of the image represented by the data stream are exposed on the photoconductive member to form a latent image, which is then developed and transferred to an appropriate image receiving medium such as paper.

Color digital printers may operate in either a single pass or multiple pass mode. In a single pass, process color system, three or four ROS imagers are positioned adjacent to a moving photoreceptor surface and are selectively energized to create successive image exposures, one for each of the three process colors, cyan, magenta and yellow. A fourth black imager is usually added. A color digital printer may also operate in a highlight color mode wherein one or two colored images and black are exposed.

In a multiple pass, process color system, each image area on the photoreceptor surface must make at least three revolutions (passes) relative to the transverse scan lines formed by the modulated beam generated by the imagers. With either system, each image is typically formed within a tight tolerance of ±0.05 mm. Each color image must be registered in both the photoreceptor process direction and in the direction perpendicular to the process direction (referred to as fast scan, lateral or transverse registration).

Techniques for registration in the process direction of ROS systems are known in the prior art and disclosed, for example, in copending application, U.S. Ser. No. 07/946,690 filed on Sep. 18, 1992, U.S. Ser. No. 07/951,744, filed on Sep. 25, 1992, and U.S. Ser. No. 07/923,925, filed on Aug. 20, 1992, all assigned to the same assignee as the present invention, all of whose contents are hereby incorporated by reference.

SUMMARY OF THE INVENTION

The present invention is directed towards simplifying the operation of a ROS color printer by accomplishing the functions of SOS, EOS with the function of process direction registration in a single device. According to the invention, a pair of quadrant cell photodetectors are positioned above the belt in the location usually occupied by the start of scan and end of scan sensors. Each photodetector has four discrete photosites or cells; as the ROS beam falls on the cell, various combinations of output signals are used to generate signals which enable SOS and EOS signals, as well as precise error signals which are used to provide correction signals to the ROS optics to correct for process direction errors.

More particularly, the present invention relates to an improved Raster Output Scanner (ROS) color printer for forming sequential color images on the surface of a photoreceptor belt moving in a process direction including:

a plurality of ROS imagers each associated with one of said color images by forming successive scan lines in a cross-process direction, detecting means for detecting the start and end of scan lines formed by each of said ROS imagers, detecting means for detecting changes in the location of the scan lines in the process direction relative to a known position of the photoreceptor belt, the improvement wherein the means for detecting the start and end of scan lines and the means for detecting changes in the process direction location of the scan lines are combined into a single detecting device comprising a quadrant cell photodetector having four separate but adjacent cells.

DESCRIPTION OF THE INVENTION

Figure 1:
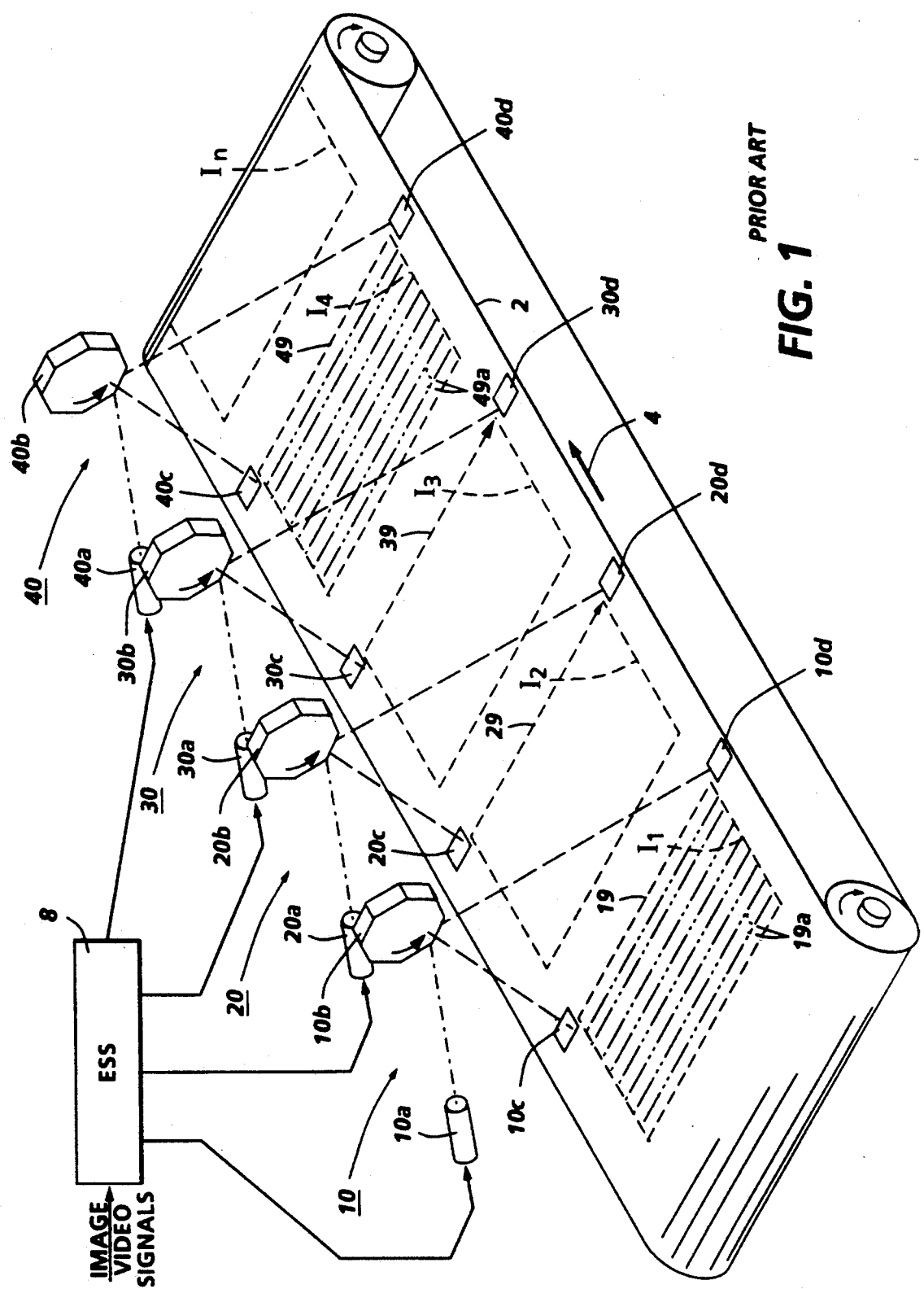
FIG. 1 shows a conventional ROS multicolor printing system.

Referring initially to FIG. 1, before describing the invention in detail, there is shown a prior art, single pass, ROS multicolor printing system having four ROS systems, 10, 20, 30, and 40. The multicolor printing system includes a photoreceptor belt 2, driven in a process direction, indicated by the arrow 4. The length of the belt 2 is designed to accept an integral number of spaced image exposure frames, $I_1$-$I_N$ represented by dashed line rectangles. Each exposure frame has an associated charging station (not shown, but upstream from the imager) which places a predetermined electrical charge on the surface of belt 2. Although the same image area is successively exposed by each imager to form superimposed and registered images, for descriptive purposes, image areas $I_1$-$I_N$ are shown representing each successive, exposed frame. Each image area $I_1$-$I_N$ is exposed successively by ROS systems 10, 20, 30, 40, respectively. As each of the image exposure frames $I_1$-$I_N$ reaches a transverse (cross-process) line of scan, represented by lines 19, 29, 39, 49, the frame is progressively exposed on closely spaced transverse raster lines, shown generally with exaggerated longitudinal spacing as reference numerals 19a and 49a on the image areas $I_1$ and $I_4$, respectively.

Downstream from each exposure station, a development station (not shown) develops the latent image formed in the associated image area. A fully developed color image is then transferred to an output sheet at a transfer station (not shown). The charge, development, and transfer stations are conventional in the art. Details of charge and development xerographic stations in a multiple exposure single pass system are disclosed, for example, in U.S. Pat. Nos. 4,833,503; 4,611,901 and 4,791,452, the contents of which are hereby incorporated by reference.

Each ROS system 10, 20, 30, and 40 contains its own conventional scanning components, as variously described in the art. For purposes of simplicity, each ROS system 10, 20, 30, 40 is shown as having two components, namely, a laser light source 10a, 20a, 30a, 40a and a rotating polygon 10b, 20b, 30b, 40b, respectively. It will be appreciated by those of skill in the art that multiple scan lines may also be generated with a single ROS in a multiple pass system.

An exemplary ROS system 10, includes a gas, or preferably, diode laser light source 10a, having an output which is modulated by signals from control circuit 8, which output is optically processed to impinge on the facets of rotating polygon 10b. Each facet reflects the modulated incident laser beam as it is rotated to produce a scan line which is focused at the photoreceptor surface 2. Electronic Sub System (ESS) 8 contains the circuit and logic modules which respond to input video data signals and other control and timing signals to operate the photoreceptor drive in synchronism with the image exposure and to control the rotation of the polygon 10b by a motor (not shown). The other ROS systems 20, 30, 40, have their own associated light sources 20a, 30a, 40a, and polygons 20b, 30b, 40b, respectively.

As shown in FIG. 1, there are also two sets of scan line sensors associated with each ROS station. ROS station 10 has a start-of-scan (SOS) sensor 10c and an end of scan sensor (EOS) 10e, which are positioned above the surface of belt 2 at the ends of the path of the scanning beam. These sensors generate a single pulse each time a scan line is swept across the photoreceptor surface, thereby establishing a start and end of scan for the image content for that particular line. Each ROS 20, 30, 40 has an associated detector pair. These sensors are typically PIN-type photodetectors.

Figure 2:
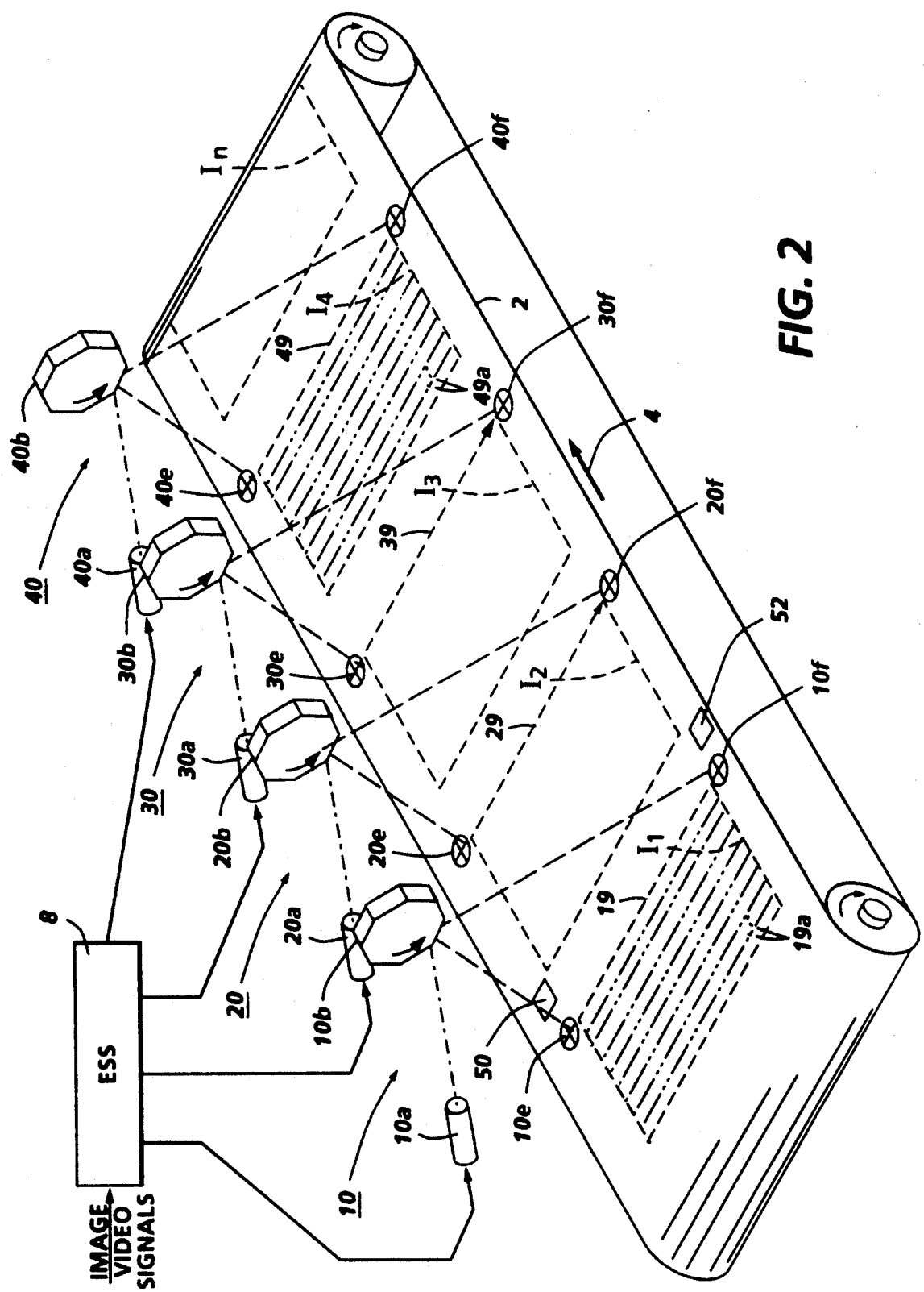
FIG. 2 shows the first embodiment of the invention.

The ROS system must be color-registered so that each image $I_1$-$I_N$ is registered in both the fast scan (transverse) direction and in the process direction. Prior art solutions disclosed formation of holes in the belt outside the image area, location of photosensors beneath each image station and detection of light passage through the belt holes as it advances in the process direction. The light may be provided, either from a dedicated light source as described in co-pending applications Ser. No. 07/635,835, filed on Jan. 3, 1991 and Ser. No. 07/859,746, filed on Mar. 30, 1992 or from the ROS scanning beam itself, as disclosed, for example, in co-pending application Ser. No. 07/807,927, filed on Dec. 16, 1991. After correction signals are generated, various techniques are used to alter the characteristics or position of optical elements in the ROS optical system, as described, for example, in co-pending applications Ser. No. 07/863,893, filed on Mar. 6, 1992; Ser. No. 07/821,526, filed on Jan. 16, 1992; Ser. No. 07/951,714, filed on Sep. 25, 1992. According to the present invention and as shown in FIG. 2, the system of FIG. 1 has been modified by replacing the SOS, EOS sensors shown in FIG. 1 with a pair of quadrant cell photodetectors 10e, 10f; 20e, 20f; 30e, 30f; 40e, 40f, respectively. The photodetectors are fixed in place above the surface of belt 4 and are aligned in the process direction.

Figure 3:
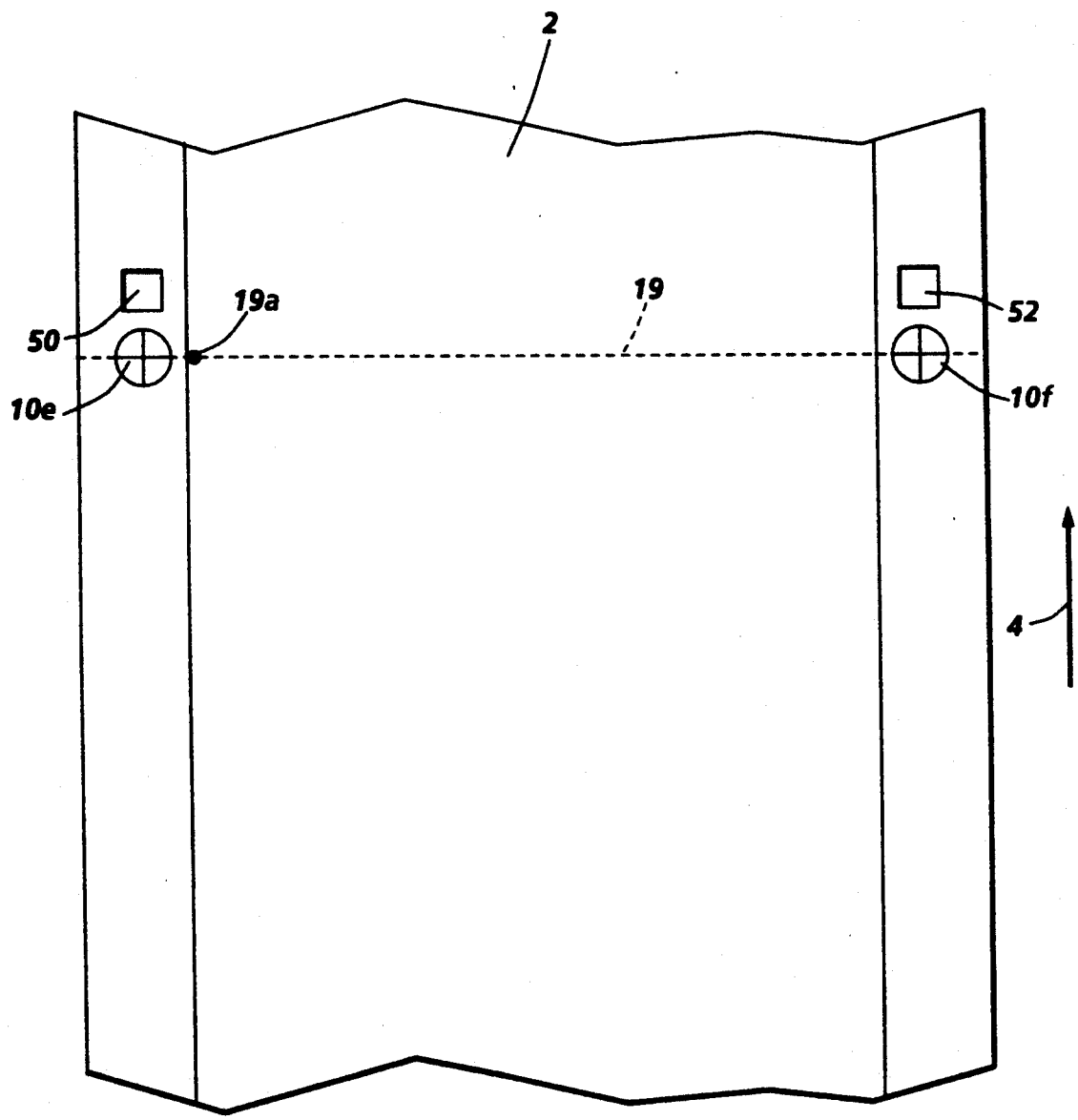
FIG. 3 shows a top view of the belt.

FIG. 3 shows a top view of a portion of belt 2 with ROS beam 19 being swept across the surface of the belt. Belt holes 50, 52, in conjunction with a fixed light source and photodetector, as described in co-pending application U.S. Ser. No. 07/635,835, provide line sync signals, which will enable the image scan sequence at the associated exposure image frame at some finite time T following detection of the hole passage. Each ROS imager station has a similar light source detector combination for detecting the passage of holes 50, 52. Therefore, each imaging station will begin the first line of the associated image frame following the same time period from detection of the holes. However, due to conicity resulting from manufacturing tolerances of the belt, the surface of the belt may be at differing locations, relative to the ROS imagers; hence, process registration errors may occur.

Figure 4:
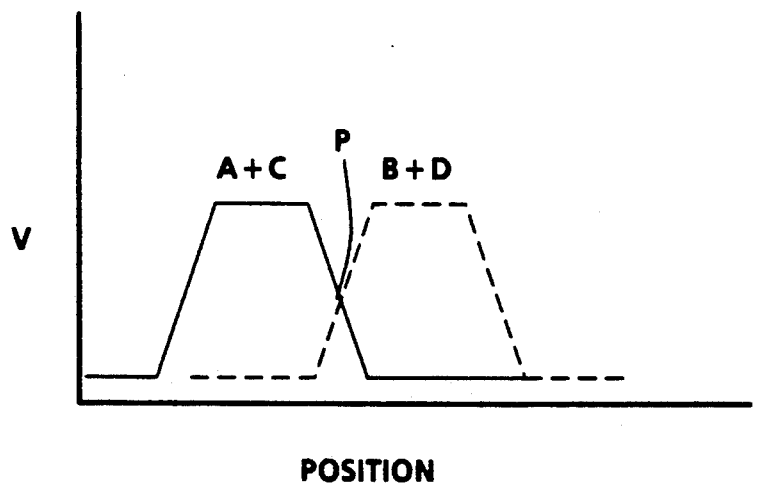
FIG. 4 shows combined signals of the EOS and SOS functions.

As shown in FIG. 3, the belt is shown at a nominal preregistered location with the beam crossing overlying the horizontal center line which forms the boundaries between photodetector cells A, B and C, D (FIG. 4). With each beam sweep, a portion of the beam is detected by each of the cells. The EOS and SOS functions are determined by the cross-over points of the combined signals from cells A+C and B+D, as shown in FIG. 4. Thus, at cross-over point P, for example, an SOS signal is generated which will cause the first pixel of image information 19a to be formed, as shown in FIG. 3. The EOS signal is formed in the same way. Detectors 20e 20f; 30e 30f, and 40e 40f operate in the same fashion. Thus, these detectors accomplish a first function; that of providing the start and end of scan signals for each image frame associated with the respective imager.

Figure 6:
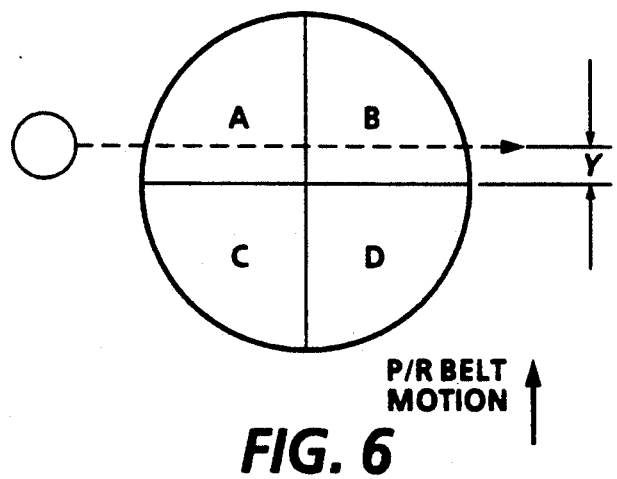
FIG. 6 shows the cell when the beam is centered.
Figure 8:
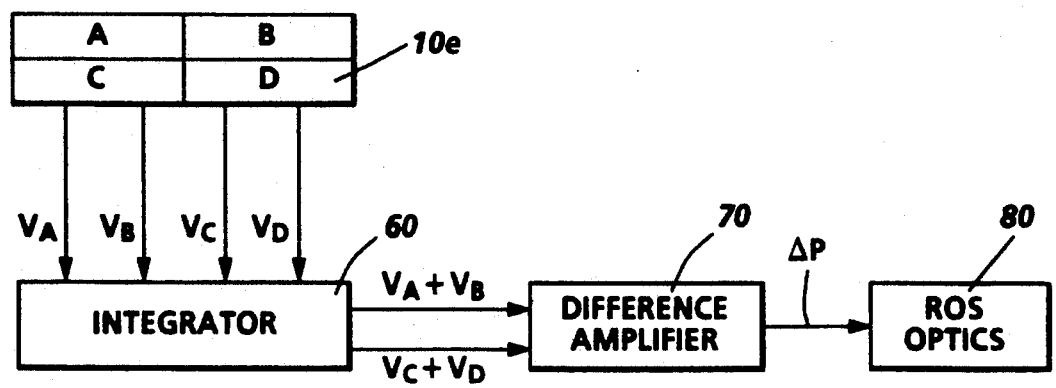
FIG. 8 shows the elements which enable the integration of output signal cells.
Figure 5:
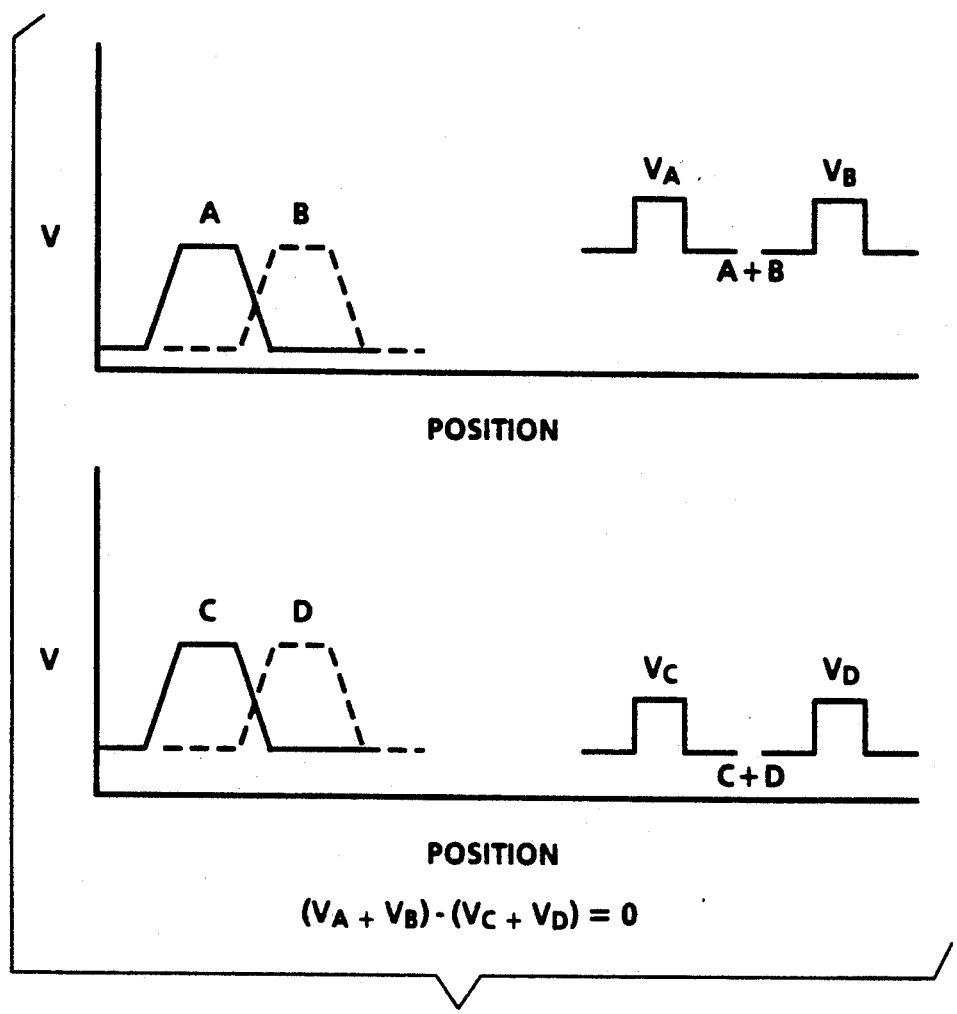
FIG. 5 shows the voltage outputs of the cells when the beam is centered.
Figure 7:
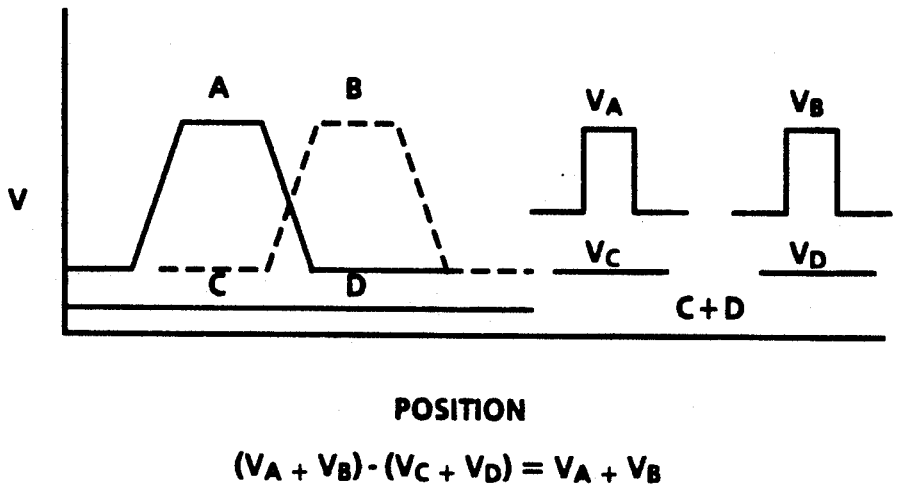
FIG. 7 shows the cross-over signal relationship.

According to a second aspect of the invention, deviations in the position of the ROS scan line in the process direction, due to, for example, misalignment of the ROS or a ROS component caused by thermal effects or belt conicity, can be detected by the cross-over points of the combined signals from cells A+B and C+D. The position of each ROS beam in the process direction is determined by the expression $(V_A+V_B)-(V_C+V_D)$. FIG. 5 shows the voltage outputs of the cells when the beam is centered on the horizontal line. As seen, the signals $(V_A+V_B)$ will equal the signals $(V_C+V_D)$ and therefore $(V_A+V_B)-(V_C+V_D)=0$. However, if the beam position has shifted, for example, a distance Y in the process direction as shown in FIG. 6, the cross-over signal relationship is changed to that shown in FIG. 7. The output signal $(V_A+V_B)$ is now greater in magnitude gaining at the expense of the signal $(V_C+V_D)$ which is now zero. Thus, $(V_A+V_B)-(V_C+V_D)=-(V_A+V_B)$. The invention contemplates a means for detecting this change in the relationship of the sum of the two voltage sets and establishing a feedback circuit to restore the original situation where the difference of the two voltage sets is zero. Referring to FIG. 8, the output signals from cell 10e are first integrated in integrator 60 and then sent to difference amplifier 70, where $(V_C+V_D)$ is subtracted from $(V_A+V_B)$. A process error signal $\Delta p$ is sent to the ROS optical system 80 to change the position of one of the optical components, for example, (a mirror as disclosed in the Ser. No. 07/807,927 application referenced supra or an optical element disclosed in Ser. No. 07/951,744, referenced supra). The correction process is iterative, continuing until the ROS beam has been moved back to the position shown in FIG. 3 and wherein the sum of $(V_A+V_B)$ will equal the sum of $(V_C+V_D)$.

While the invention has been described with reference to the structures disclosed, it is not confined to the details set forth, but is intended to cover such modifications or changes as they come within the scope of the following claims.

What is claimed is:

1. An improved Raster Output Scanner (ROS) color printer for forming sequential color images on the surface of a photoreceptor belt moving in a process direction including:

a plurality of ROS imagers each associated with one of said color images by forming successive scan lines in a cross-process direction, detecting means for detecting the start and end of scan lines formed by each of said ROS imagers, detecting means for detecting changes in the location of the scan lines in the process direction relative to a known position of the photoreceptor belt, the improvement wherein the means for detecting the start and end of scan lines and the means for detecting changes in the process direction location of the scan lines are combined into a single detecting device comprising a quadrant cell photodetector having four separate but adjacent cells.

2. The printer of claim 1 further including means for comparing combined signals from each of said cells to obtain start of scan and end of scan signals and for generating process error correction signals.

3. The printer of claim 2 wherein said means for comparing said combined signals includes means for integrating signals from each of said photodetector cells, comparing said signals to generate process error signals and means responsive to said error signals to change the position of said scan line in the process direction until said error signal is reduced to zero.

4. The printer of claim 2 wherein said quadrant cell photodetector has four cells A, B, C, D, each cell generating a voltage $V_A$, $V_B$, $V_C$, $V_D$, upon detection of said scan lines, where said start of scan and end of scan signals are generated by crossover signals from combined signals from cells (A+C) and (B+D).

5. The printer of claim 4 wherein the position of each of said scan lines in the process direction is determined by the expression $(V_A+V_B)-(V_C+V_D)$ and wherein said signal comparing means includes means for subtracting $(V_C+V_D)$ from $(V_A+V_B)$ and for generating error signals representing the voltage differences between said two exposures.

* * * * *